324-77. SR 11-02-71 XR 3,617,625

United States Patent [11] 3,617,625

[72] Inventor Donald C. Redpath
Winchester, Mass.
[21] Appl. No. 819,829
[22] Filed Apr. 28, 1969
[45] Patented Nov. 2, 1971
[73] Assignee Itek Corporation
Lexington, Mass.

[54] IMAGE CORRELATION SYSTEM
18 Claims, 6 Drawing Figs.

[52] U.S. Cl. .......... 178/6.5, 178/6.8, 235/181, 250/220 SP, 324/77 G, 356/204
[51] Int. Cl. .......... G06f 15/34, H04n 9/56
[50] Field of Search .......... 356/2; 250/220 SP; 235/181; 324/77 G, 77 J; 179/15 A, 15.55; 343/100; 178/6.5, 6.8

[56] References Cited
UNITED STATES PATENTS

| | | | |
|---|---|---|---|
| 3,157,781 | 11/1964 | Gruen | 235/181 |
| 3,328,686 | 6/1967 | Fuchs | 235/181 |
| 3,435,194 | 3/1969 | Peschon | 235/181 |
| 3,513,257 | 5/1970 | Hobrough | 356/2 |

*Primary Examiner*—Robert L. Griffin
*Assistant Examiner*—Joseph A. Orsino, Jr.
*Attorneys*—Homer O. Blair, Robert L. Nathans and William C. Roch

ABSTRACT: A dual image correlation system wherein a pair of video signals representing detail along corresponding paths in compared images are first filtered in low-pass filter circuits and then cross-multiplied with the original signals to produce a pair of product outputs. By providing the filter circuits with linear, frequency-dependent 0°–180° phase shift responses and sharp cutoff characteristics, the difference between the product outputs is indicative of both the magnitude and sense of image detail misregistration along the corresponding paths.

Inventor:
Donald C. Redpath,
by John E. Toupal
Attorney

Inventor:
Donald C. Redpath,
by John E. Toupal
Attorney

Inventor:
Donald C. Redpath,
by John E. Toupal
Attorney

IMAGE CORRELATION SYSTEM

BACKGROUND OF THE INVENTION

This invention relates generally to a control system for combining related electrical signals and is especially suited for use with dual image registration systems.

Although not so limited, the present invention is particularly well suited for use with image registration systems employed during the production of topographic maps. Typically, maps of this type are obtained from stereoscopically related photographs taken from airplanes. When the photographs are accurately positioned in locations corresponding to the relative positions in which they were taken, their projection upon a suitable base can produce for an observer a three-dimensional presentation of the particular terrain imaged on the photographs.

Because of practical flight photography limitations, however, the stereo photographs generally do not possess images of exactly corresponding surface areas. For this reason a coherent stereo presentation is obtained only if the photographs are properly registered, i.e. so positioned that homologous areas in the two projections are aligned and have the same orientation. The problem of image registration is accentuated by the fact that image detail in the photographs typically is not identical in all respects. Such detail nonuniformity is caused, for example, by photographing a scene from different camera viewpoints or by variations in altitude, roll and pitch of the photographic aircraft. The resultant distortion between corresponding areas in the photographs prevents common detail registration when the images retained by both photographs are projected onto a common viewing plane.

There have been developed several types of systems which simplify the registration of stereo images. Basically, most such systems derive video signals from image detail in each photograph of a stereogram and then correlate and analyze the video signals to produce error signals indicating various types of distortion. These error signals are used to control image displacement and transformation equipment that produce registration of the projected images. The image transformation can be accomplished, for example, by altering the rasters in the scanning devices utilized, by introducing relative movement between the two photographs, by controlling adjustable optical devices used for projection of the images, etc. Examples of stereo image registration systems are disclosed in U.S. Application Ser. No. 394,502 entitled "Photographic Image Registration" and filed Sept. 4, 1964, now U.S. Pat. No. 3,432,674; and U.S. Application Ser. No. 691,536 entitled "Image Correlation System" and filed Dec. 18, 1967, both assigned to the assignee of this invention.

A fundamental requirement of all image registration systems is the production of a parallax or "raw" error signal representing in composite form the total distortion existing between the stereo images being compared. Generally, this composite error signal is derived in a correlator system that detects phase difference in the video signals obtained by scanning each photograph of the stereogram. Preferably, the derived error signal should possess an amplitude representing the magnitude of distortion existing between the compared images and a polarity indicative of the sense of the detected distortion. In addition, the composite error signal should be as noise-free as possible so as to facilitate a signal analysis that results in the production of discrete error signals each representing a different type of distortion.

A general object of this invention, therefore, is to provide an improved image registration system. A more specific object is to provide an improved video signal correlator circuit for use in image registration systems.

CHARACTERIZATION OF THE INVENTION

The invention is characterized by the provision of a signal correlation system for comparing first and second input signals and including a first low-pass filter for receiving one input signal, a second low-pass filter for receiving the second input signal, a first multiplier that multiplies the first input signal times the output signal from the second low-pass filter and a second multiplier that multiplies the second input signal times the output signal from the first low-pass filter, and a subtractor circuit that subtracts the first multiplier output from the second multiplier output. By providing the first and second low-pass filters with a matched phase shift response, one obtains a subtractor circuit output indicative of phase difference existing between the original input signals.

A feature of the invention is the provision of a correlation system of the above type wherein the low-pass filters produce, for substantially all passed frequencies, phase shifts of angular values the sines of which have a common sign. This system provides a subtractor circuit output signal having a sign that corresponds to the sense of any phase displacement existing between the compared video signals. In a preferred embodiment the filters produce phase shifts of between 0° and 180° so as to establish the desired relationship.

Another feature of the invention is the provision of a correlation system of the above type wherein the low-pass filters produce a phase shift that varies substantially linearly with frequency. The use of filters with linear phase shift response insures a constant time delay for all frequency components of the transmitted video signals.

Another feature of the invention is the provision of a correlation system of the above types wherein the multipliers are linear, four-quadrant multipliers so as to insure the production of a subtractor circuit output that represents the sense of phase displacement existing between the compared video signals.

The invention is characterized further by the provision of an image registration system including a dual image scanner for producing a pair of video signals representing image detail along corresponding paths in a pair of compared images, a plurality of correlation systems of the above types for correlating different frequency bands of the generated video signals, and analyzer system for analyzing the outputs from the plurality of correlation systems, and a transformation system for producing registration of the compared images in response to the output of the analyzer system. The use of separate channels improves the sensitivity of the registration system and by providing the filters in each channel with bandwidths having center frequencies at a five-to-one ratio, the drop in response is desirably limited to 3 over the full range of the system.

DESCRIPTION OF THE DRAWINGS

These and other objects and features of the present invention will become more apparent upon a perusal of the following specification taken in conjunction with the accompanying drawings wherein.

DESCRIPTION OF THE PREFERRED EMBODIMENT

Figures 1, 3, 4, 5:
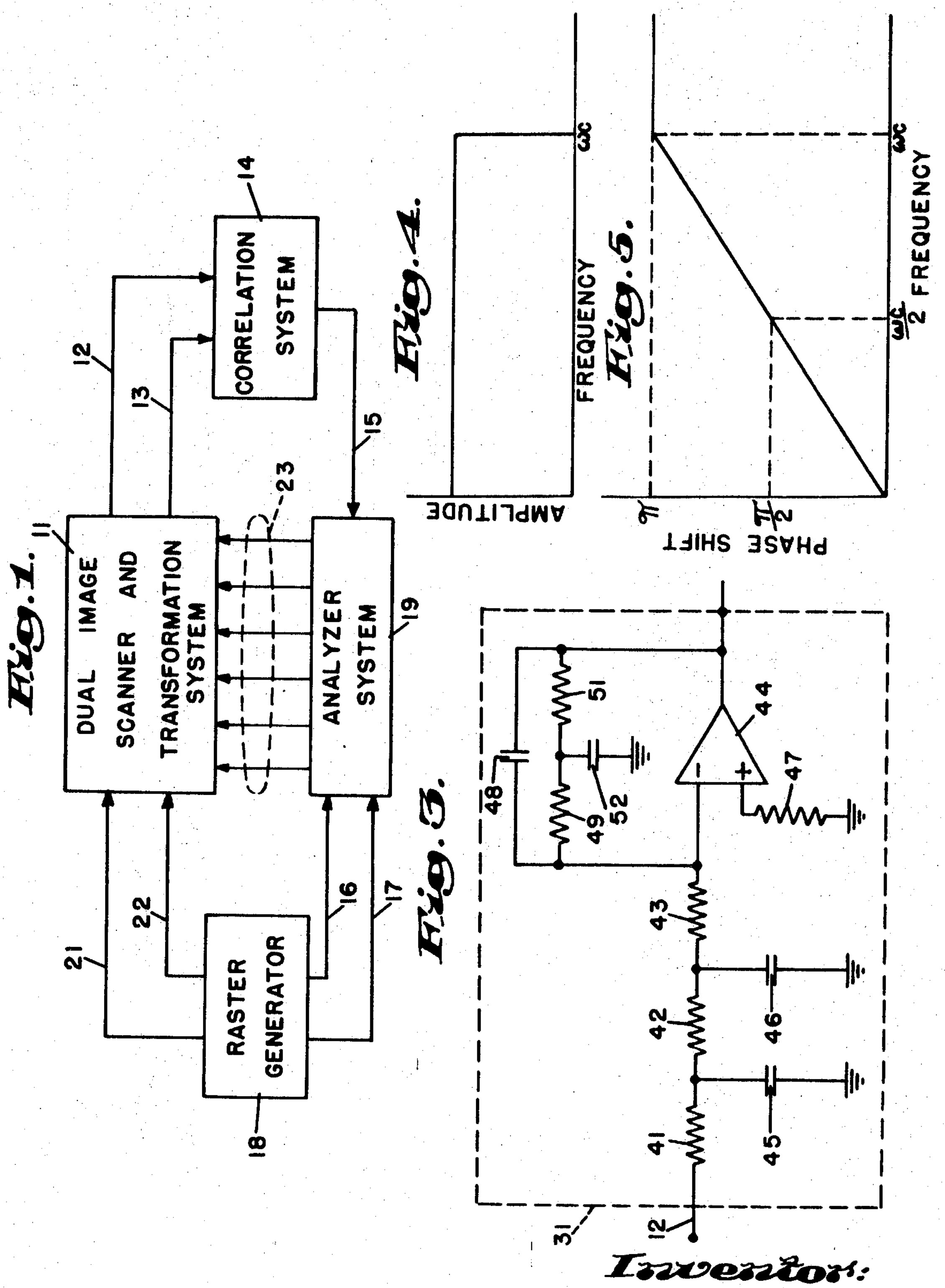
FIG. 1 is a block circuit diagram illustrating a preferred dual image registration system embodiment of the invention.
FIG. 3 is a schematic circuit diagram of one of the low-pass filters shown in FIG. 2.
FIG. 4 is a graph illustrating the amplitude vs. frequency response for the filter circuit shown in FIG. 3.
FIG. 5 is a graph illustrating the phase shift vs. frequency response for the filter circuit shown in FIG. 3.

Shown in FIG. 1 is the dual image scanner and transformation system 11 which is adapted to simultaneously scan corresponding paths in a pair of stereo photographs and provide on lines 12 and 13 video signals representing the image detail along those paths. The video signals on lines 12 and 13 are applied to the correlation system 14 that provides on line 15 a composite error signal indicating relative displacement between the common image detail along the simultaneously scanned paths. Receiving the composite error signal on line 15 in addition to reference signals on lines 16 and 17 from the raster generator 18 is the analyzer system 19. The raster generator 18 also provides on lines 21 and 22 deflection voltages for the scanning devices used in the scanner system 11.

Analysis in system 19 of the composite error signal on line 15 with respect to the reference signals on line 16 and 17 produces on lines 23 discrete error signals representing various types of relative distortion existing between the projected images of the photographs being scanned in the transformation system 11. These signals are applied to the scanner and transformation system 11 and used to eliminate the image distortion that they represent. The details of the image scanner and transformation system 11 and the analyzer system 19, which do not per se comprise a part of the present invention, are conventional and can be, for example, of the type disclosed in the above noted U.S. Application No. 394,502, now U.S. Pat. No. 3,432,674, and U.S. Application No. 691,536.

Figure 2:
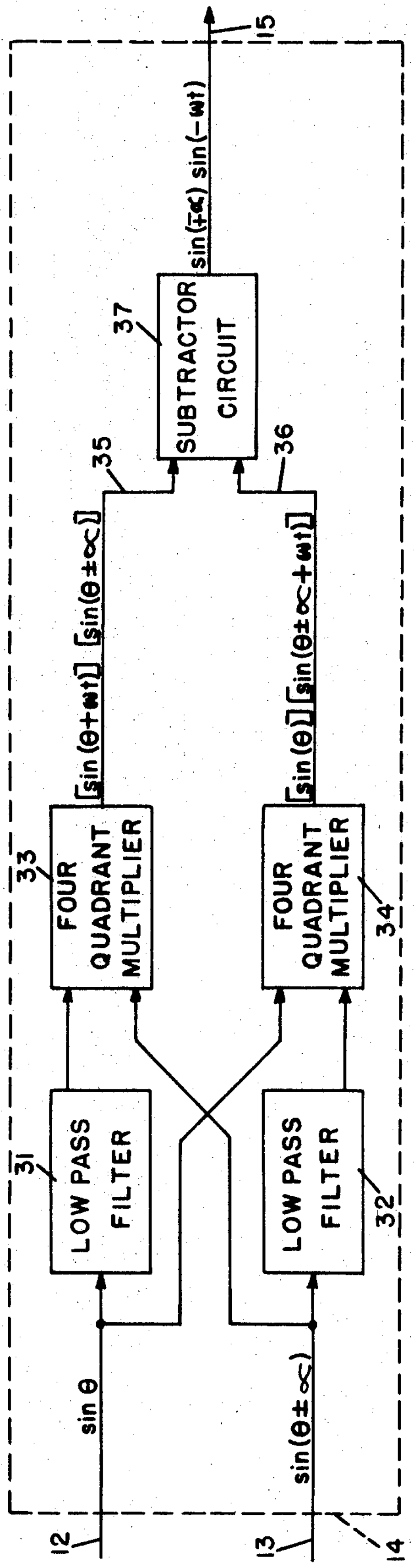
FIG. 2 is a block circuit diagram of the correlation system shown in FIG. 1.

Referring now to FIG. 2 there is shown in block circuit form the correlation system 14 of FIG. 1. Included is the low-pass filter 31 that receives the video input signal on line 12 and the identical low-pass filter 32 that receives the video input signal on line 13. The output of low-pass filter 31 is applied to the multiplier 33 along with the video signal on line 13 while the output signal from low-pass filter 32 is applied to an identical multiplier 34 along with the input video signal on line 12. Receiving the product output signals from the multipliers 33 and 34 on lines 35 and 36, respectively, is the subtractor circuit 37 that provides a difference output on signal line 15.

FIG. 3 is a schematic circuit diagram of the low-pass filter 31 that is shown in FIG. 2 and is identical to the low-pass filter 32. The three resistors 41–43 connect the input terminal 12 to the operational amplifier 44. Connected between ground and the junctions between the resistors 41–43 are the capacitors 45 and 46. The operational amplifier 44 also is grounded through the resistor 47. Coupled directly across the operational amplifier 44 is the parallel combination of the capacitor 48 and the series-connected resistors 49 and 51. The capacitor 52 is connected between ground and the junction between the resistors 49 and 51.

In a preferred embodiment the low-pass filter circuit 31 is built with components having relative values as tabulated in Tables 1 and 2 below.

TABLE 1

| Resistor | Value |
|---|---|
| 47 | R |
| 41 | 1/6R |
| 42 | 2/3R |
| 43 | 1/6R |
| 49 | 1/2R |
| 51 | 1/2R |

TABLE 2

| Capacitor | Value |
|---|---|
| 45 | 12C |
| 46 | 12C |
| 48 | 1.2C |
| 52 | 16/3C |

FIG. 4 is a graph illustrating the amplitude versus frequency response of the filter circuit shown in FIG. 3. As shown, the circuit exhibits a sharp cutoff in response at a frequency of $\omega c$. The phase shift response of the filter 31 is illustrated in FIG. 5. As shown, the circuit exhibits a linear phase shift versus frequency response producing a 180° shift at the cutoff frequency $\omega c$ and a 90° shift at a frequency of $\omega c/2$. Because of its linear response, the circuit 31 introduces a constant time delay for all frequencies below $\omega c$.

In the preferred embodiment of the invention, the multipliers 33 and 34 shown in FIG. 2 are wideband multipliers of the linear four-quadrant type that effect proportional multiplication of the received signals. Circuit details of the multipliers 33 and 34 are conventional and can be, for example, of the type described in Electrical and Electronic Series, Fundamentals of Television Engineering, 1955, McGraw-Hill Book Co., Glassford, at page 503, "The Double Balanced Modulator as a Multiplying Circuit."

Because of the above-described characteristics of the low-pass filters 31 and 32 and of the multipliers 33 and 34, the correlation circuit 14 provides on output line 15 a signal that indicates both the magnitude and sign of any phase displacement existing between the input video signals on lines 12 and 13. This can best be illustrated by a mathematical analysis of the circuit's operation. Assuming, for simplicity, that we are comparing two photographs of identical image content and that the video signals representing that image content are sin waves, we have an input signal sin $\theta$ on line 12 and an input signal sin $(\theta\pm\alpha)$ on line 13 where $\alpha$ represents the phase displacement existing between the two signals. Obviously, this displacement also represents misregistration existing between the compared images. After subtraction in circuit 37 of the product outputs from the multipliers 33 and 34 we have an output on line 15 of:

$$[\sin(\theta+\omega t)][\sin(\theta\pm\alpha)]-[\sin\theta][\sin(\theta\pm\alpha\pm\omega t)] \qquad (1)$$

which after reduction and multiplication gives:

$$\tfrac{1}{2}[\cos(\omega t\mp\alpha)-\cos(2\theta+\omega t\pm\alpha)]-\tfrac{1}{2}[\cos(\mp\alpha-\omega t)-\cos(2\theta\pm\alpha+\omega t)]. \qquad (2)$$

Collecting terms we have:

$$\tfrac{1}{2}[\cos(\omega t\mp\alpha)-\cos(-\omega t\mp\alpha)] \qquad (3)$$

and reducing we obtain:

$$[\sin\tfrac{1}{2}(\mp 2\alpha)]\,[\sin\tfrac{1}{2}(-2\omega t)] \qquad (4)$$

$$=\sin(\mp)\sin(-\omega t) \qquad (5)$$

Since $\alpha$ represents the phase displacement between the input signals on lines 12 and 13, the sin $(\mp\alpha)$ term represents an output voltage component with a value proportional to the magnitude of displacement over a ±90° range. Also, this output component has a polarity indicative of the direction of that displacement. The other output component represented by term sin $(-\omega t)$ affects the amplitude of the composite output but does not change its polarity. That is because the sign or polarity of the term sin $(-\omega t)$ is uniform over the entire passband of the low-pass filters 31 and 32 which introduce phase shifts of between 0° and 180° for all passed frequencies. Thus, the output signal on line 15 has an amplitude dependent upon the magnitude of relative displacement between the compared images and a polarity that indicates direction of that displacement.

Figure 6:
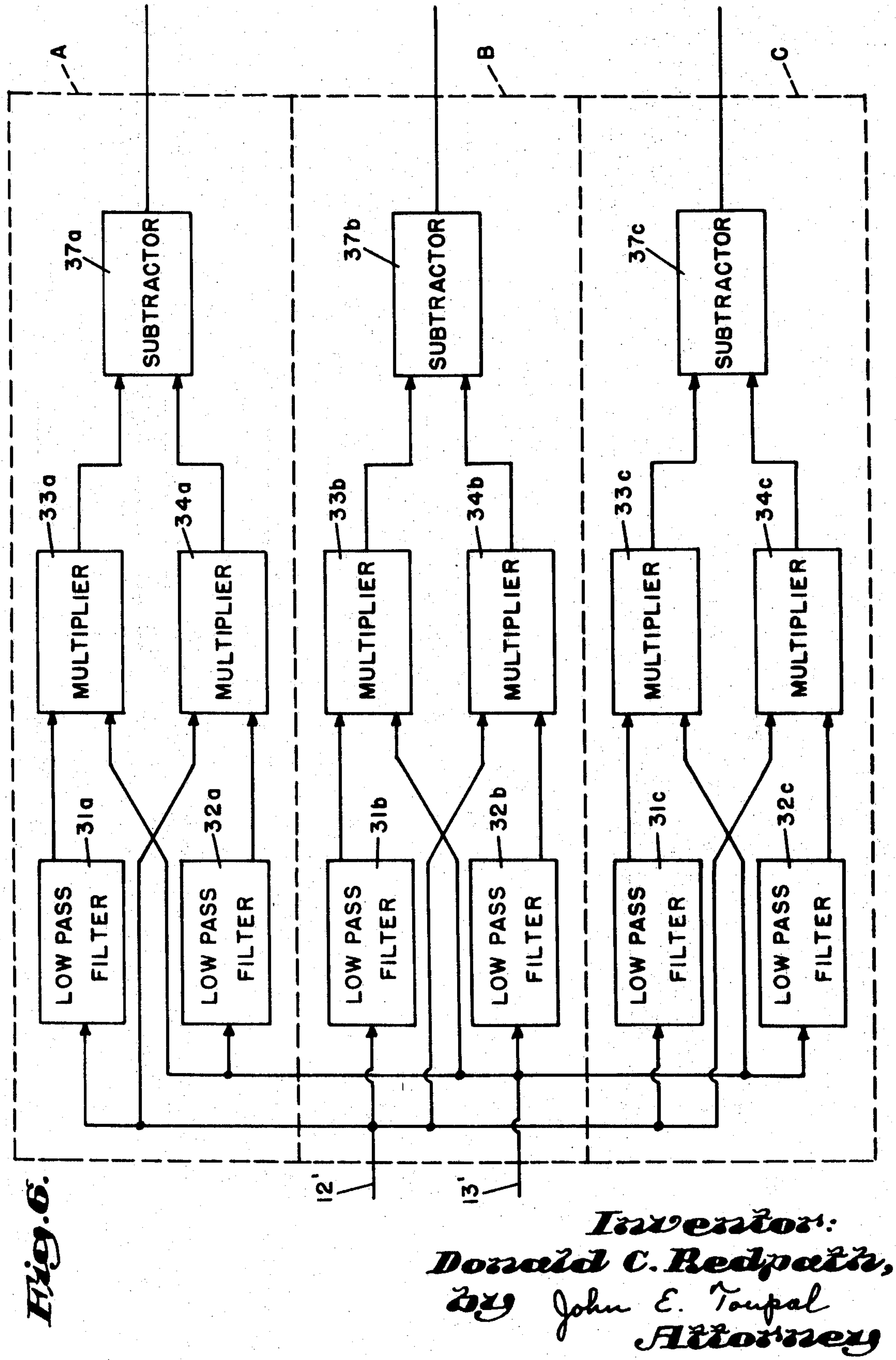
FIG. 6 is a block circuit diagram of another correlation system embodiment suitable for use in the dual image registration system shown in FIG. 1.

FIG. 6 illustrates another correlation system embodiment suitable for use in registration system of FIG. 1. In this embodiment, the video signals on lines 12' and 13' are separated into three separate channels A, B and C. Each of the channels includes a pair of low-pass filters, a pair of multipliers and a subtractor connected as in the embodiment of FIG. 2. Thus, the signal on line 12' is applied to low-pass filter **31*a* and multiplier 34*a* in channel A, to low-pass filter 31*b* and multiplier 34*b* in channel B, and to low-pass filter 31*c* and multiplier 34*c* in channel C. Similarly, the video signal on line 13' is applied to low-pass filter 32*a* and multiplier 33*a* in channel A, to low-pass filter 32*b* and multiplier 33*b* in channel B, and to low-pass filter 32*c*multiplier 33*c* in channel C. The outputs of the multipliers in the three channels are applied, respectively, to the subtractors 37*a*, 37*b* and 37*c* which provide outputs indicative of both the magnitude and sense of phase displacement existing between the signals on lines 12' and 13'**.

The individual components in each of the channels A, B and C are identical to those described above in connection with FIG. 2 except that the pair of low-pass filters in each channel are tuned to a different frequency band so as to divide into segments the entire bandwidth desired. Thus, low-pass filters 31*a* and 32*a* in channel A would provide a passband 0-$A_\omega$, the filters 31*b* and 32*b* in channel B would provide a passband 0-$B_\omega$, and filters 31*c* and 32*c* in channel C would provide a passband $0-C_\omega$ where $A_\omega$, $B_\omega$ and $C_\omega$ represent different cutoff frequencies. By dividing the video spectrum from the compared photographic images into a plurality of channels the efficiency of the correlation process is substantially improved. The reason for the improvement is that each channel senses image detail of a different scale. For example, low-frequency channels sense relatively large-scale image detail while higher frequency channels sense smaller scale image detail features. Therefore, the higher frequency channels have a greater sensitivity to detail misregistration than do the lower frequency channels and the overall sensitivity of the system can be improved by increasing the contribution of the high-frequency channels. A system for improving sensitivity in this way is disclosed in above noted U.S. Application Ser. No. 394,502, now U.S. Pat. No. 3,432,674, wherein appropriate weighting of the individual channels is accomplished prior to their combination and use as image transformation control signals.

However, as noted in equation 5 above, the output of correlation system 14 is dependent upon the sine of the phase shift $\omega t$ introduced by low-pass filters 31 and 32. As shown in FIG. 5 this phase varies between 0° and 180°. Consequently, the sin $(-\omega t)$ component produces maximum response at $\omega c/2$ and a 3db. drop in response at $\omega c/6$ and at $5\omega c/6$. Limiting the drop in response for the system of FIG. 6 to a maximum 3db. level therefore entails selection of bandwidths so as to provide a five-to-one ratio for the cutoff frequencies $A_\omega$, $B_\omega$ and $C_\omega$ of channels A, B and C and accordingly for their center frequencies $A_\omega/2$, $B_\omega/2$ and $C_\omega/2$.

Obviously, many modifications and variations of the present invention are possible in light of the above teachings. It is to be understood, therefore, the invention can be practiced otherwise than as specifically described.

What is claimed is:

1. A system for producing registration of images having relatively homologous detail content and comprising signal-generating means for producing first and second video signals representing image detail along corresponding paths in a pair of images, a first low-pass filter connected to receive said first video signal, a second low-pass filter connected to receive said second video signal, said first and second low-pass filters having matched phase shift response, a first multiplier connected to receive the second video signal and the output signal from said first low-pass filter, a second multiplier connected to receive the first video signal and the output signal from said second low-pass filter, a subtractor circuit connected to receive the output signals from said first and second multipliers, and image transformation means responsive to the output of said subtractor circuit.

2. A system according to claim 1 wherein said first and second low-pass filters produce for substantially all passed frequencies phase shifts of angular values the sines of which have a common sign.

3. A system according to claim 2 wherein said first and second low-pass filters produce a phase shift that varies substantially linearly with frequency.

4. A system according to claim 3 wherein said first and second low-pass filters produce phase shifts of between 0° and 180°.

5. A system according to claim 4 including a plurality of channels each comprising a pair of said matched first and second low-pass filters, the characteristics of each pair of matched first and second low-pass filters being selected to produce a center frequency in each channel which differs from the center frequency of an adjacent channel by the ratio of 5 to 1.

6. A system according to claim 5 wherein said first and second multipliers are linear four-quadrant multipliers.

7. A system according to claim 1 wherein said first and second multipliers are linear four-quadrant multipliers.

8. A system according to claim 7 wherein said first and second low-pass filters produce for substantially all passed frequencies phase shifts of angular values the sines of which have a common sign.

9. A system according to claim 8 wherein said first and second low-pass filters produce a phase shift that varies substantially linearly with frequency.

10. A system according to claim 9 wherein said first and second low-pass filters produce phase shifts of between 0° and 180°.

11. A signal correlation system for comparing first and second electrical input signals comprising a first low-pass filter for receiving the first input signal, a second low-pass filter for receiving the second input signal, said first and second low-pass filters having matched phase shift response, a first multiplier connected to receive the second input signal and the output signal from said first low-pass filter, a second multiplier connected to receive the first input signal and the output signal from said second low-pass filter, and a subtractor circuit connected to receive the output signals from said first and second multipliers.

12. A system according to claim 11 wherein said first and second low-pass filters produce for substantially all passed frequencies phase shifts of angular values the sines of which have a common sign.

13. A system according to claim 12 wherein said first and second low-pass filters produce a phase shift that varies substantially linearly with frequency.

14. A system according to claim 13 wherein said first and second low-pass filters produce phase shifts of between 0° and 180°.

15. A system according to claim 11 wherein said first and second multipliers are linear four-quadrant multipliers.

16 A system according to claim 15 wherein said first and second low-pass filters produce for substantially all passed frequencies phase shifts of angular values the sine of which have a common sign.

17. A system according to claim 16 wherein said first and second low-pass filters produce a phase shift that varies substantially linearly with frequency.

18. A system according to claim 17 wherein said first and second low-pass filters produce phase shifts of between 0° and 180°.

* * * * *